Sept. 27, 1960 H. J. MORAN 2,954,191
CONTROLLED FLOW PARACHUTE CANOPY
Filed Aug. 23, 1957 3 Sheets-Sheet 1

INVENTOR.
Harold J. Moran
BY
Curtis, Morris + Safford
ATTORNEYS

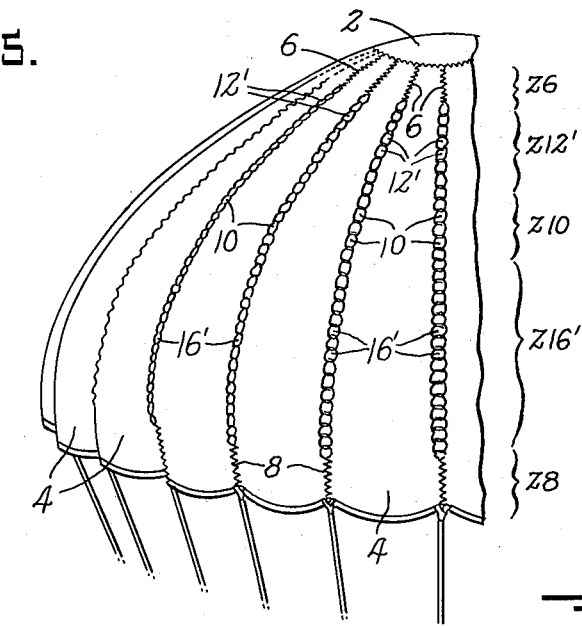
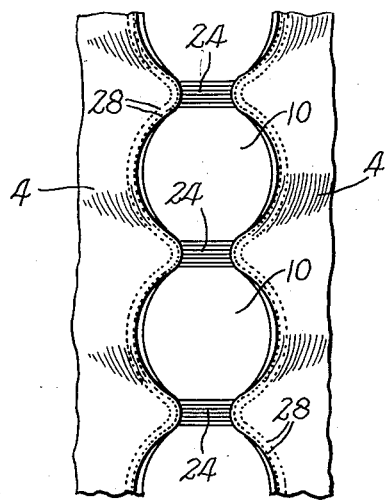
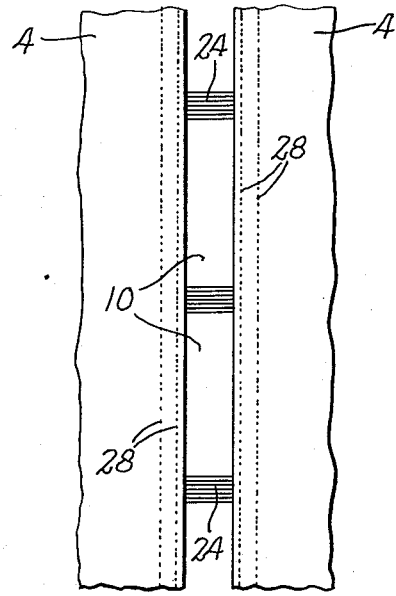

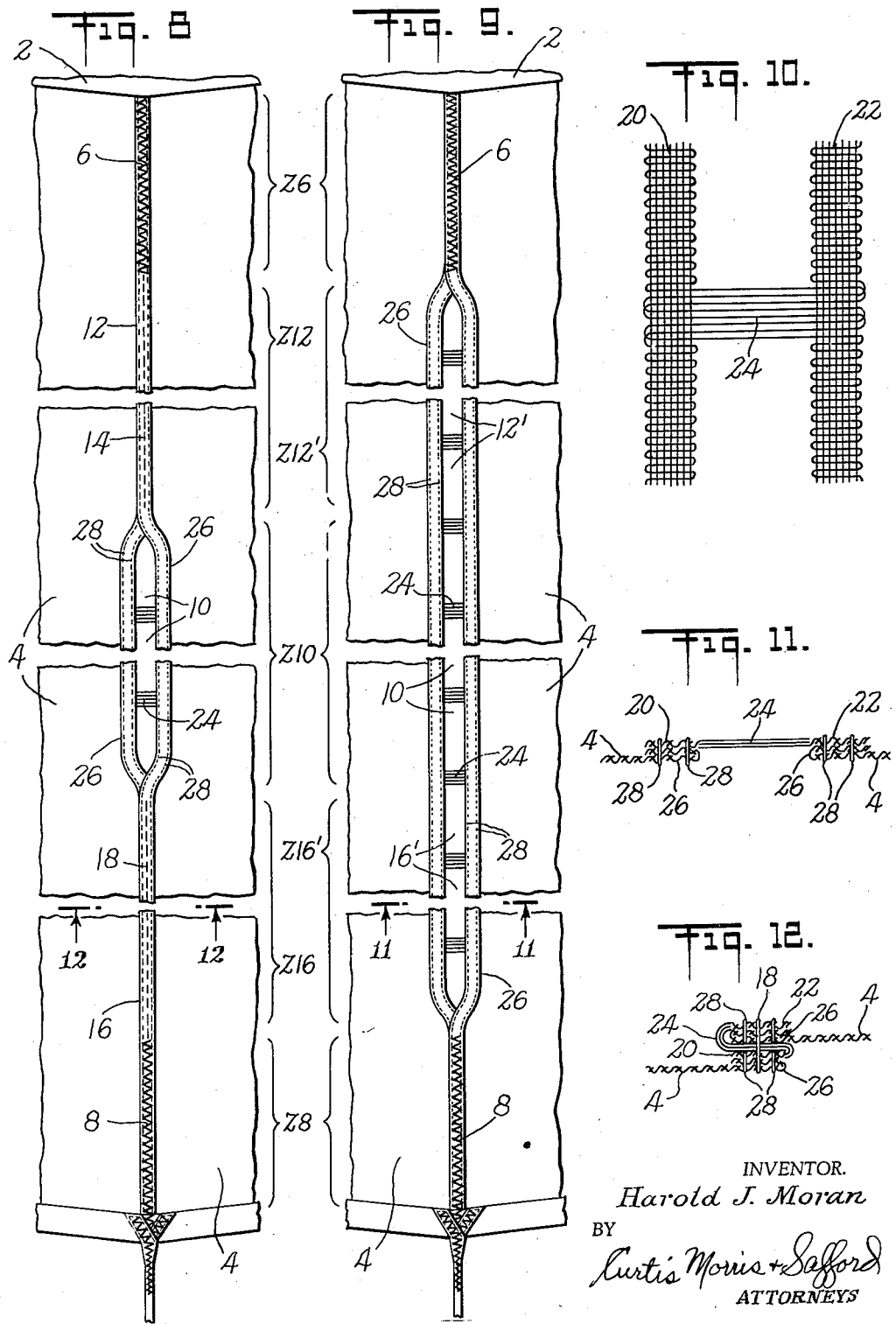

United States Patent Office 2,954,191
Patented Sept. 27, 1960

2,954,191

CONTROLLED FLOW PARACHUTE CANOPY

Harold J. Moran, Trenton, N.J., assignor to Switlik Parachute Company, Inc., Trenton, N.J., a corporation of New Jersey Filed Aug. 23, 1957, Ser. No. 679,911

2 Claims. (Cl. 244—145)

This invention relates to a controlled flow parachute canopy for use in parachute assemblies for personnel, cargo, in aircraft landing and stabilization, and in the recovery of missiles and the like.

As late as December 1955 the United States Air Force in the specification of United States Letters Patent 2,726,057 reviews the art as follows:

"To persons versed in the art it is known that the opening of a conventional type parachute is accomplished (sic) by a shock resulting from the decelerating force applied by the parachute at the moment of opening to the load carried by it.

"This force results from the air pressure on the parachute which reaches a maximum soon after the opening of the parachute and drops to minimum as the load is decelerated. It is further known that the force or air pressure concentration is greatest at the apex or in the center of the parachute. Conventional type parachutes have vents at this point for purposes of releasing air pressure and for purposes of stability. Any increase in the size of vents allows more air to escape but also permits a greater rate of descent. Similarly, a greater load results in greater air pressure in the region of the vent, and also results in a greater rate of descent, and a greater shock upon opening.

"Known means to achieve a low opening shock on parachutes are:

(1) Increase the filling time of the canopy.
(2) Use reefing, which is basically a variation of 1.
(3) Install a pressure relief valve at the point of highest canopy pressure.
(4) Provide for critical opening speeds of the parachute.

"Long filling times have been reached by high total porosity as on ribbon parachutes or by the use of opening brakes, such as inside curved leading edges of the canopy, utilized on 'Guide Surface' and 'Extended Skirt' parachutes; but these designs have the disadvantages that either the drag coefficient is very low or the opening shock decrease is not sufficient.

"Reefing has been proven successful and reliable, but it requires hardware in the canopy, replacement parts and increased maintenance.

"Decrease of the high pressure peak has been obtained through:

(1) A temporary increase in porosity as on ribbon parachutes with long vertical ribbons, but this is connected with a loss in drag coefficient.

(2) A temporary increase in vent area by use of rubber or spring elements. These methods were up to now only partially successful; moreover, the installation of hardware or rubber in the canopy is not preferred.

"Parachutes with a critical opening speed have been tested in wind tunnels. High porosity solid flat and ribbon parachutes have been built which open at low speeds, close at high speeds and open again at low speeds. Not much has been done, however, to develop full size parachutes with a critical opening speed. How far this critical opening speed can be utilized in actual repeated drop tests with various parachutes is unknown: it can be assumed, however, that such parachutes would have to be built with very close tolerances and would need a high porosity which again decreases the drag coefficient."

With the development of the extremely high-speed airplanes and the continued use of the relatively lower speed planes, new problems have arisen in the parachute art, for it is desirable to standardize the parachutes for various uses, especially for personnel, so that the same type of parachute is usable not only in a drop from a high-speed airplane but also in a drop from a low-speed airplane.

It is well known that the shock incident to opening in a drop from a high-speed airplane is far greater than that when the parachute is dropped from a low-speed airplane, with the result that the canopy and the load are subjected to destructive forces of various intensities.

There has been the need for some time for a canopy that is so constructed that when the parachute is dropped from a high-speed airplane, the shock of opening will be gradually absorbed and the impact on the personnel or cargo consequently lessened or distributed over a relatively long period of time. It has also been desirable to create a canopy which will automatically adjust itself to use in a high-speed airplane as well as in a low-speed airplane.

Drop tests have shown that the canopy of the instant application overcomes the disadvantages present in the prior art that, among others, have been pointed out above and accomplishes certain other beneficial results as will later appear.

This is accomplished, broadly speaking, by providing the canopy with a closed peak in contradistinction to the vented peak of the conventional parachute canopy, by providing the canopy with a relatively large and sometimes automatically variable porosity with the result that the drag coefficient is materially increased and by providing for the increase of the porosity as an incident to the opening of the canopy and to provide, at the same time, an increase of effective diameter of the canopy above the skirt thereof.

A canopy according to my invention, therefore, comprises generally a plurality of panels terminating at their upper end edges at a closed peak. Adjacent panels are joined along their opposed longitudinal edges by an overlap seam which is strongly stitched for permanent closure at its upper and lower end portions. Said seam is interrupted or said edges are left free to move apart at a mid-portion to provide an initially and permanently open vent. And between said vent and said strongly stitched end portions, the seam is initially closed by frangible means, as weak or relatively frangible stitching at one end of said vent and stronger but frangible stitching at the other end of said vent which stitchings can be disrupted in desired sequence longitudinally of the panels by predetermined values of air pressure in the canopy and thus provide additional progressively increased venting as and when needed for extra shock cushioning purposes. The overlapping panel edges are advantageously connected at intervals along the length of said initial vents and said weakly stitched portions of the seam by cross-members which serve in part to limit the extent of the vent openings laterally and in part as baffles disposed across the vent openings. These cross-members are conveniently provided as part of suitable binding or reinforcing tapes stitched securely to opposed longitudinal edge portions of adjacent panels. Where said tapes are woven simultaneously in spaced relation on the same loom, suitable cross-members or baffles are formed between them at desired intervals by carrying runs of the weft threads back and forth across the intervening space. Except as thus interrupted by said runs, the tapes so formed are selvaged along both edges.

Drop tests have shown that such parachutes as the 30 foot Air Force B–5 when dropped from an aircraft traveling at approximately 275 knots have a shock load of approximately 3470 pounds and that a 26 foot canopy constructed in accordance with the present invention, which would be expected to have a greater shock load than the above referred to 30 foot canopy, actually had a shock load of approximately 1720 pounds.

In the drawings I have illustrated a canopy formed in accordance with my invention, in which drawings Figure 1 is a view showing the canopy in a conventionalized form immediately after it has started to open;

Figure 5 is an elevational view of the canopy shown in Figure 1 after it has been completely opened as when dropped from a high-speed airplane;

Figure 6 is a fragmentary view of edge portions of adjacent panels showing in conventionalized form the vents as initially open and while they are performing their cushioning action;

Figure 7 is a conventionalized showing of vents provided between adjacent edge portions of adjacent panels while the load is being completely sustained;

Figure 8 is a view in conventionalized form showing the position of particular initially open vents in a seam of the canopy and other portions of the seam in which vents are present but unopened;

Figure 9 is a view similar to Figure 8 showing the initially open vents and also additional vents opened after the canopy has been completely inflated and extended and the load suspended;

Figure 10 is a view diagrammatically showing the construction of twin binding tapes for reinforcing the edges of the panels and providing the tying elements extending across vent openings between the panels;

Figure 11 is a transverse section on line 11—11 of Figure 9; and

Figure 12 is a transverse section on line 12—12 of Figure 8.

Figure 1:
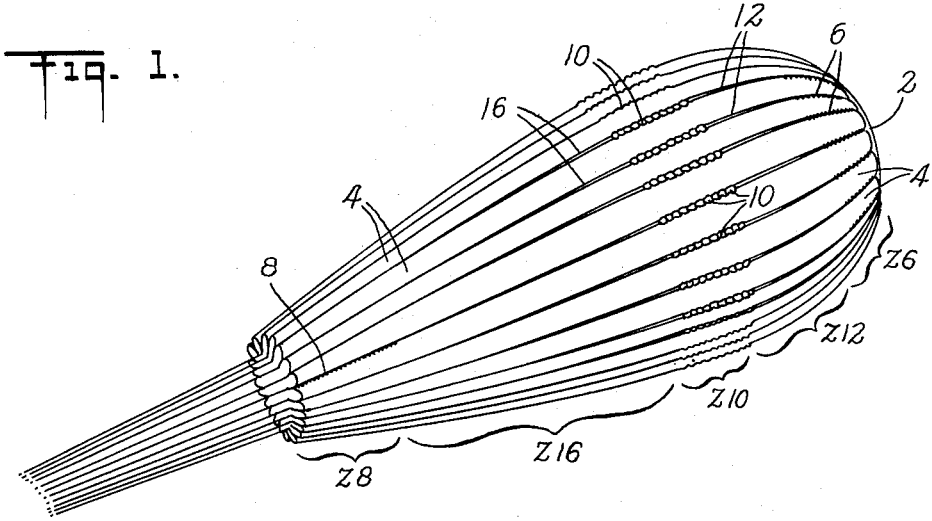
Figure 2:
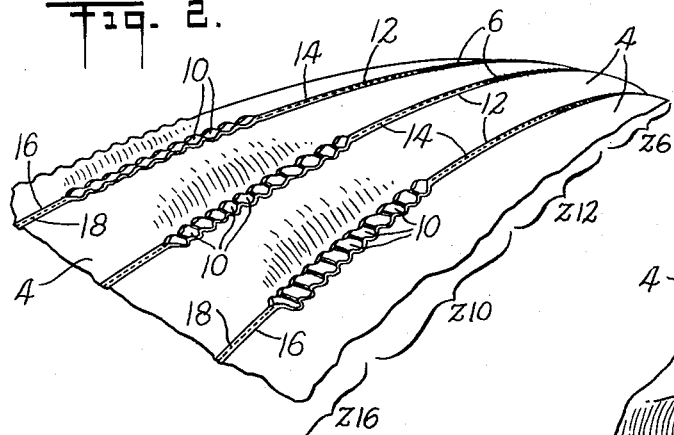
Figure 2 is an enlarged fragment of a portion of the canopy adjacent to the peak after the canopy has begun to open.

As indicated in the drawings, an embodiment of my invention in one form of parachute canopy comprises a top or peak piece 2 and a plurality of inter-connected panels 4 having their top edges secured to the peripheral edge of said peak piece 2.

The opposed longitudinal or lateral edges of adjoining panels 4 are connected by seams. In the construction shown in Figure 8, the seams are permanently securely closed at their top end portions, as 6, and, at their bottom end portions, as 8, a convenient arrangement being to form said portions of the seams by strong stitching with the joined lateral edge portions of one panel overlapping the adjacent lateral edge portions of an adjacent panel.

Intermediate portions of the seams formed at overlapping edges of said joined panels are left unstitched, to provide an initially open vent, as 10. Between said vent 10 and the permanently stitched upper seam end 6 is a temporarily closed or weakly stitched seam portion 12 wherein overlapping edge portions of the adjacent panels 4 are joined by means of a frangible stitching 14, or other suitable temporary and frangible closure means. Another seam portion 16 temporarily closed with frangible stitching 18 extends downwardly from the initially open vent 10 to the lower permanently closed and strongly stitched end portion 8.

In making a canopy wherein opposed longitudinal edges of the panels are joined by seams as above described, it will be advantageous to bind or reinforce said edges by suitable means such as the twin tapes or strips 20, 22, Figure 10, which are conveniently woven with selvage edges at the same time in the same loom and in such manner as to cause the weft threads to form groups of tape connecting strands 24 at spaced intervals. Each of these groups 24 serves to form a flexible strap or connection between and integral with the strips or tapes 20 and 22 and thereby to limit the extent of transverse opening not only of the initially and normally open vent 10, but also of the additional or supplemental vents 12' and 16' which are opened when sufficient pressure is built up inside the canopy to break the frangible stitchings 14 and 18 respectively.

Where the connected twin tapes 20 and 22 are employed as panel binding or reinforcing means, they are conveniently secured to turned over edge portions 26 of the joined panels 4 by parallel rows of stitching 28, Figures 11 and 12. As seen in Figure 12, where the bound or reinforced edges of panels 4 are joined, as in the temporarily closed portions 12 and 16, Figure 8, they overlap; and said strands 24 are turned in and pass between the overlapping portions which are held in initially or temporarily closed or joined condition by said single rows of stitching 14 and 18, respectively. It is contemplated that said stitchings 14 and 18, or other equivalent temporary seam closing expedient, will be arranged and adapted to be broken automatically when air pressure in the canopy increases to a predetermined maximum. In the illustrated embodiment, the stitchings 14 and 18 are relatively weak or of relatively weak and easily frangible thread compared to stitches 28, for example, or the stitches employed at the permanently closed portions 6 and 8 of the seam. Thus, where it is advantageous to use thread of appropriate dimensions and strength for all seam-closing purposes on a given canopy, a desired degree of frangibility of the stitchings in temporary seams 14 and 18 may be made to depend on the various strength characteristics of different types or forms of the stitches employed in seaming, so that each of said frangible seams is rendered capable of resisting outwardly applied pressure up to any desired predetermined extent, as it may develop inside the canopy.

In operation of the apparatus above described with a conventional load, as a paratrooper for example, upon launching, the parachute and the load fall freely until shortly after the operator pulls his rip cord and the canopy begins to fill. In the first instant of opening of the canopy and when the chute begins to sustain the load, pressure develops rapidly in the peak of the canopy and builds up from there downwardly. The open vents 10, which collectively form what may be termed an initial pressure relieving or venting zone Z10, Figures 1, 2, 3, 5 and 8, in effect a bellows-like area, serves initially to facilitate the discharge or venting of air from within the canopy and in that manner to delay to some extent the otherwise more rapid accumulation of pressure at that zone. If the conditions, such as plane speed, canopy area, load weight and/or other pertinent factors are such that the maximum pressure developed in the canopy as it comes full open and takes over the total load is relatively low or below a predetermined value, the load may descend without further opening of the seams for venting. Other factors being the same, this would be typical operation in parachuting from a relatively slow flying plane.

Figure 4:
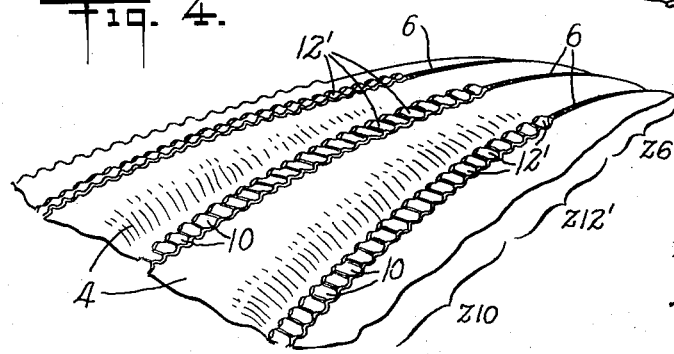
Figure 4 is a view similar to Figure 2 in which is shown a second stage of the opening of the vents.

If the same load and the same parachute are launched from a plane flying sufficiently faster, for example, the shock producing pressure at the peak builds up faster and to a higher maximum than before so that, if only the vents 10 were available, the decelerating shock would be greater than that experienced on launching from a slower flying plane. Accordingly, progressively increasing supplemental venting longitudinally of the panels is effectively supplied to provide extra cushioning effect automatically when excessive (i.e. over a predetermined value) air pressure operates to break first the frangible seam closures in a secondary pressure relieving zone Z12, Figure 4, and later, if need be, the frangible seams in a tertiary pressure relieving zone Z16, Figure 5, which would then provide, for this particular parachute and load, the maximum venting and most effective relatively gradual and progressively increasing cushioning of the load against deceleration shock under the stated conditions. In view of the functions of the parts as above described, said zones Z10, Z12 and Z16, Figure 1, provide collectively a load cushioning area as distinguished from other portions of the canopy which provide no vents. In the shock phase, the vent openings in said area, as 10, 12' and 16' may take the laterally extended form as seen in Figure 6. When the load is wholly sustained and exerting normal pull on the canopy, as in a conventional descent, said openings tend to assume the narrower elongated slot-like form, as in Figure 7, thereby to that extent automatically effecting reduced venting and a correspondingly increased drag co-efficient as the slot edges are brought toward or retained closer to each other.

Figure 3:
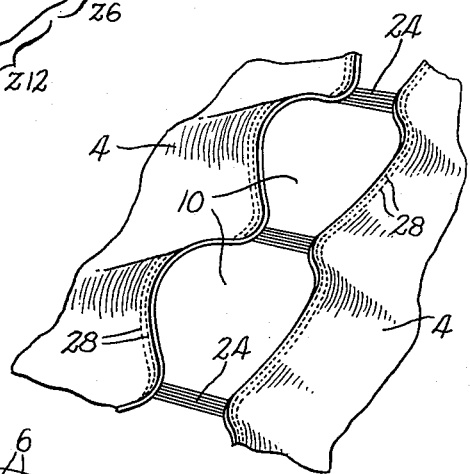
Figure 3 is an enlarged fragmentary view of portions of adjacent edges of two adjacent panels showing the condition of the vents after the canopy has started to open but before the load is completely sustained by the canopy and while the cushioning action of a bellows-like area is being employed.

In the cushioning phase of use of a canopy as above described, it is contemplated that the initially open vents, as 10, will be expanded laterally, Figure 6, with an accompanying bellows-like wrinkling of portions of panel areas disposed between adjacent seams, Figure 3. Thus, the vent openings in the canopy seams are capable of providing a wide range of aperture size varying from a mere slot, Figure 7, under low internal pressure to a widely extended air vent, Figure 6, under high internal pressure. When the conditions of use require relatively quick supplemental or additional venting to cushion shock and deferred supplemental venting thereafter to offset a later build-up of excessive pressure, the desired remedial quick venting occurs, for example, where the weaker or more frangible stitching at zone Z12 is adapted to yield at a lower interior pressure than the stronger or less frangible stitching at zone Z16. As previously noted, the desired seam frangibility or capability of being breached by outwardly directed pressure within the canopy may be effected by selecting an appropriate stitch form which yields when the predetermined pressure is applied, or by employing for the frangible seams threads of appropriate relative strengths calculated to break when predetermined pressures occur in the canopy. With this arrangement, the venting capacity and the porosity of the canopy may be said to vary automatically, since within predetermined limits they increase with increased pressure and diminish with lowered pressure. This characteristic in part contributes to the maintenance of a constantly adequate drag co-efficient. In other words, the value of that co-efficient for any canopy need not be sacrificed to attain the needed porosity for effective cushioning against the shock of deceleration.

It is also contemplated that a canopy embodying the present invention will have improved stability in use as compared to known types of corresponding size. An example would be there more quickly reduced pendulum swing of the load at or after deceleration, or the prompt damping of such swings in turbulent air or under other conditions. It is believed that these effects may be due at least in part to the arrangement of the vents below the peak in one or more laterally disposed annular zones having different times or degrees of venting effect. Thus, as air under pressure discharges from inside the canopy through said vents with deceleration, it appears that low pressure or suction develops in effective value with lifting or drag effect both on the top surface of the peak and on lateral panel surfaces between rows of vents. It is thought that the top and side drag forces so produced tend to balance or remain in a ratio one to the other which may depend on such factors, among others, as the peak and panel areas, the venting volume, venting rate, deceleration rate, etc. For whatever reason, these canopies exhibit superior stability over conventional chutes under test conditions.

What is claimed is:

1. A parachute canopy comprising a closed peak member, a plurality of longitudinally arranged panels connected at their upper ends to said member, said panels being joined by longitudinal seams, each of said seams having a permanently closed top and bottom portion and a central portion with initially fully open air venting slots, each said seam between said central and top portions having an upper portion initially fully closed but breachable into fully open air venting slots by a predetermined excess of air pressure in said canopy, said seam between said central and bottom portions having a lower portion initially fully closed but breachable into fully open air venting slots by a further excess of air pressure in said canopy greater than said predetermined pressure, whereby said parachute automatically adapts to use with both high-speed and low-speed aircraft.

2. The structure in claim 1 wherein the edges of each of said seams are joined at generally equally spaced intervals along its length by permanent weft threads, and are joined in said upper and lower portions respectively by first and second sets of frangible stitches which initially hold said portions fully closed, and which when said pressures are exceeded break independently to leave said permanent weft threads joining said seams and forming fully open venting slots.

References Cited in the file of this patent

UNITED STATES PATENTS

| 2,734,706 | Jalbert | Feb. 14, 1956 |

FOREIGN PATENTS

| 756,803 | France | Sept. 25, 1933 |
| 1,107,168 | France | Aug. 3, 1955 |